US009665239B1

(12) United States Patent
Koh et al.

(10) Patent No.: US 9,665,239 B1
(45) Date of Patent: May 30, 2017

(54) FACILITATING USER PROGRESSION IN A VIRTUAL SPACE BASED ON USER PURCHASES OF VIRTUAL CURRENCY

(71) Applicant: KABAM, INC., San Francisco, CA (US)

(72) Inventors: James Koh, Mountain View, CA (US); Kellen Christopher Smalley, Pleasanton, CA (US); Matthew Curtis, Novato, CA (US)

(73) Assignee: Aftershock Services, Inc., San Francisco, CA (US)

( * ) Notice: Subject to any disclaimer, the term of this patent is extended or adjusted under 35 U.S.C. 154(b) by 341 days.

(21) Appl. No.: 13/946,900

(22) Filed: Jul. 19, 2013

(51) Int. Cl.
G06F 3/0481 (2013.01)

(52) U.S. Cl.
CPC .................. G06F 3/04815 (2013.01)

(58) Field of Classification Search
CPC ............ G07F 17/3255; G07F 17/3244; G07F 17/3262; G07F 17/3225; G07F 17/3239; G07F 17/3258; G07F 17/326; G07F 17/3267
USPC ............................................. 705/35; 715/850
See application file for complete search history.

(56) References Cited

U.S. PATENT DOCUMENTS

| 7,458,892 | B2 | 12/2008 | Walker et al. ............... 463/25 |
| 8,221,223 | B2 | 7/2012 | Walker et al. ............... 463/25 |
| 8,239,487 | B1 | 8/2012 | Hoffman et al. ............ 709/218 |
| 8,287,383 | B1 | 10/2012 | Etter |
| 8,292,743 | B1 | 10/2012 | Etter |
| 8,382,581 | B2 | 2/2013 | Fargo .............................. 463/25 |
| 8,443,039 | B2 | 5/2013 | Hoffman et al. ............ 709/203 |
| 8,454,442 | B2 | 6/2013 | Van Luchene ................ 463/42 |
| 8,469,801 | B2 | 6/2013 | Ocko et al. .................... 463/25 |
| 8,510,413 | B1 | 8/2013 | Hoffman et al. ............ 709/218 |
| 2002/0072412 | A1 | 6/2002 | Young et al. .................. 463/42 |
| 2002/0077169 | A1 | 6/2002 | Kelly et al. ................... 463/16 |
| 2006/0178966 | A1* | 8/2006 | Jung et al. ..................... 705/35 |
| 2007/0167210 | A1 | 7/2007 | Kelly et al. ................... 463/16 |
| 2007/0243928 | A1 | 10/2007 | Iddings ......................... 463/26 |
| 2008/0090659 | A1 | 4/2008 | Aguilar |
| 2009/0029769 | A1* | 1/2009 | Muller ................... A63F 13/10 463/31 |
| 2009/0164287 | A1 | 6/2009 | Kies et al. ...................... 705/8 |
| 2009/0247282 | A1 | 10/2009 | Cheng ............................ 463/25 |
| 2010/0223115 | A1 | 9/2010 | Chodosh et al. ........ 705/14.12 |
| 2011/0264489 | A1 | 10/2011 | Ganetakos et al. ........... 705/12 |
| 2011/0300923 | A1 | 12/2011 | Van Luchene |
| 2011/0302037 | A1 | 12/2011 | Sutton-Shearer ......... 705/14.66 |
| 2012/0122586 | A1 | 5/2012 | Kelly et al. ................... 463/42 |
| 2012/0157212 | A1 | 6/2012 | Kane et al. .................... 463/42 |
| 2012/0178515 | A1 | 7/2012 | Adams et al. ................. 463/17 |
| 2012/0225723 | A1 | 9/2012 | Webster et al. ............... 463/42 |
| 2012/0244950 | A1 | 9/2012 | Braun ............................ 463/42 |

(Continued)

*Primary Examiner* — Jeffrey A Gaffin
*Assistant Examiner* — Mandrita Brahmachari
(74) *Attorney, Agent, or Firm* — Sheppard Mullin Richter & Hampton LLP

(57) ABSTRACT

A system and method for facilitating user progression in a virtual space based user purchases of virtual currency are disclosed. The facilitated user progression may include user progression a virtual space ability or abilities based on purchases of the virtual currency with real world money. Such user progression in those abilities may be distinct and separate from user progressions in other virtual space abilities based on gameplays by the users.

18 Claims, 4 Drawing Sheets

(56) References Cited

U.S. PATENT DOCUMENTS

| | | | |
|---|---|---|---|
| 2012/0259698 A1 | 10/2012 | Yurow | 705/14.51 |
| 2012/0265604 A1 | 10/2012 | Corner et al. | 705/14.39 |
| 2012/0289330 A1 | 11/2012 | Leydon | |
| 2012/0289346 A1 | 11/2012 | Van Luchene | 463/42 |
| 2012/0323683 A1 | 12/2012 | Feldman et al. | 705/14.53 |
| 2012/0329560 A1 | 12/2012 | Kelly et al. | 463/42 |
| 2013/0036064 A1 | 2/2013 | Osvald et al. | 705/319 |
| 2013/0046621 A1 | 2/2013 | Asseoff et al. | 705/14.51 |
| 2013/0072308 A1 | 3/2013 | Peck et al. | 463/42 |
| 2013/0079131 A1 | 3/2013 | Lam | |
| 2013/0079145 A1 | 3/2013 | Lam | |
| 2013/0130781 A1 | 5/2013 | Anderson | |
| 2013/0138489 A1 | 5/2013 | Fargo | 705/14.12 |
| 2013/0159086 A1 | 6/2013 | Richard | 705/14.33 |
| 2013/0226694 A1 | 8/2013 | Boyd et al. | 705/14.49 |
| 2013/0231999 A1 | 9/2013 | Emrich et al. | 705/14.43 |
| 2013/0252727 A1 | 9/2013 | Ocko et al. | 463/29 |
| 2013/0339111 A1 | 12/2013 | Ross et al. | 705/14.12 |
| 2013/0344968 A1 | 12/2013 | Halfteck et al. | 463/43 |
| 2014/0080590 A1 | 3/2014 | Link et al. | 463/27 |
| 2014/0128153 A1 | 5/2014 | Driemeyer et al. | 463/25 |
| 2014/0164142 A1 | 6/2014 | Yang | 705/14.69 |
| 2014/0194197 A1 | 7/2014 | Graziosi et al. | 463/29 |
| 2014/0248943 A1 | 9/2014 | Burgin et al. | 463/29 |

\* cited by examiner

FACILITATING USER PROGRESSION IN A VIRTUAL SPACE BASED ON USER PURCHASES OF VIRTUAL CURRENCY

FIELD OF THE DISCLOSURE

This disclosure relates to facilitating user progression in a virtual space, the user progression being facilitated based on user purchases of virtual currency.

BACKGROUND

Virtual space systems that facilitate user progression through leveling are known. Users of those systems are typically enabled to advance their levels within the virtual space through gameplays facilitated by those systems. For example, a user may accumulate experience points through gameplays by interacting with virtual space objects and/or competing with other players within the virtual space.

SUMMARY

One aspect of the disclosure relates to facilitating users to progress in a virtual space ability based on purchases of virtual currency by users of the virtual space. For facilitating such user progression in the virtual space ability, levels of the users the ability may be incremented based on transactions in which the users purchases virtual currency using consideration having real money value. Such consideration may include, for example, real world money, another virtual currency purchased with real world money, and/or other consideration. In some examples, the user progression in those abilities based on the user purchases of virtual currency may be separate and distinct from the user progression in other virtual space abilities for which progression may be based on gameplay by the users. User progression based on user purchases of the virtual currency may incentivize user purchases of the virtual currency, may provide added consideration to the users for purchasing the virtual currency, and/or may provide other enhancements. Purchases of the virtual currency may be the only way to advance in the virtual space ability or abilities for which progress is determined based on purchases of the virtual currency.

A system configured to facilitate user progression in a virtual space ability or abilities based on purchases of virtual currency by the users may include a server. The server may operate in a client/server architecture with one or more client computing platforms. The client computing platforms may be associated with the users of the virtual space. The server may be configured to execute one or more of a space module, user module, currency exchange module, store module, first ability module, second ability module and/or other modules.

The space module may be configured to execute an instance of the virtual space in which an online game takes place. The online game may include a browser-based multiplayer game, a multiplayer mobile game, a massive multiplayer online role-playing game, a LAN (local area network) party game, and/or any other types of online game wherein multiple players interact with the virtual space and/or with each other. The instance of the virtual space may comprise a simulated space that is accessible by users via clients that present the views of the virtual space to a user. The users may participate in the instance of the virtual space by controlling one or more of the available user controlled elements in the virtual space. The user may participate in the instance of the virtual space by initiating actions in the virtual space.

Within the instance of the virtual space, virtual space abilities representing ranges of user actions and/or user interactions may be provided. The virtual space abilities provided in the instance of the virtual space may take many forms to enable corresponding ranges of user actions and/or interactions, for example such as, to allow the users to perform different virtual space maneuvers, to research or discover virtual technologies, to take special actions during combat, to create virtual items, to build special virtual space infrastructure, to upgrade existing virtual space entities to new types of entities, to avoid penalties, to improve powers, strength, and/or health, and/or any other forms. As a given user progresses in the virtual space by gaining new skills, powers, virtual technologies and/or any other virtual space abilities, the users may be able to undertake new actions, functions and/or deeds to interact with other users, non-user characters, virtual space objects, and/or engage in any other user interactions as enabled by these newly acquired abilities.

Within the instance of the virtual space, virtual currencies may be provided to facilitate store and/or exchange of virtual space values. Units of the virtual currencies (for example, a gold, a gem, a silver, a coin, a token, and so on) may provide measures of virtual space values as determined by a provider, administrator, moderator, user, and/or any other entities related to the virtual space. The virtual currencies may be consumed or redeemed by users to facilitate virtual space actions and/or activities, purchases of virtual items, transactions between users, and/or for any other purposes within the virtual space. In some examples, resources or virtual items may be used for exchanging other resources or virtual items in the virtual space, and thus may constitute forms of virtual currencies within the instance of the virtual space.

The user module may be configured to manage user accounts associated with the individual users. The user accounts may include user parameters related to the users. The user accounts may include a first user account associated with the first user that includes a first set of user parameters related to the first user. The user information managed by the user module may include information indicating levels of virtual space abilities possessed by the first user. Such virtual space ability information about the first user may include a level of a first ability and a level of a second ability of the first user in the virtual space.

The currency exchange module may be configured to facilitate transactions wherein the users purchase virtual currency with real money value. In some exemplary implementations, the virtual currency module may facilitate users to purchase virtual currency with real world money. Such facilitations may include maintaining user credit accounts linked with one or more credit cards of individual users, communicating with one or more third party payment service providers, communicating with an online currency issuer, and/or any other operations that may facilitate the users to purchase virtual currency with real world money.

The store module may be configured to present offers of virtual items for sale to the users in exchange for virtual currency purchased by the users as facilitated by the currency exchange module. The offers of virtual items may be presented by the store module through virtual store interfaces implemented on client computing platforms associated with the users. The virtual items included in the offers presented by the store module may provide benefits to the users in the online game hosted by the space module. The benefits may include virtual objects, virtual resources, virtual buildings, virtual troops, virtual services, extra play sessions, increase in user character attributes and/or any other benefits that may give the users opportunities, improved abilities, enhanced power, and/or any other advantages in interacting with the virtual space.

The first ability module may be configured to increment the levels of the users in a first ability provided in the virtual space based on gameplay by the users in the virtual space. The first ability provided in the virtual space may include virtual space abilities that enable users to acquire one or more virtual skills, to construct and/or upgrade virtual buildings, to research virtual technologies, to inflict damages, to resist damages, to exercise magic power, and/or to perform any other user actions in the virtual space as enabled by the first ability. The progression in the first ability by a given user may be effectuated in the virtual space by advancing the given user along levels of the first ability as established by provider, administrator, moderator, and/or any other entities related to the virtual space. The levels in the first ability may include rank classifications, ability hierarchies, increases in statistical attributes, and/or any other forms of levels that may be established to classify progressive range of user interactions and/or actions enabled by the first ability. The first ability module may be configured to increment the levels of the users in the first ability based on gameplay by the users within the virtual space. This may involve monitoring user interactions with the virtual space, identifying different types of user interactions, evaluating gameplays effectuated by the user interactions, awarding points and/or virtual space attributes to the users based on the user interaction evaluations, advancing users along the levels of the first ability based on the points and/or attributes awarded to the users, and/or any other operations for incrementing user levels in the first ability based on the gameplays by the users. The gameplays based on which the levels of the first ability may be incremented by the first ability module may include user performance of tasks, accumulation of points, success in activities, completion of quests, completion of objectives in the virtual space by the users and/or any other gameplays by the users within the virtual space.

The second ability module may be configured to increment the levels of the users in a second ability provided in the virtual space based on purchases of virtual currency by the users as facilitated by the currency exchange module. The second ability provided in the virtual space may include virtual space abilities that enable users to acquire one or more virtual skills, to construct and/or upgrade virtual buildings, to research virtual technologies, to inflict damages, to resist damages, to exercise magic power, and/or to perform any other user actions in the virtual space as enabled by the second ability. In some exemplary implementations, the second ability and the first ability may be separate and distinct in the virtual space such that they enable different types of user interactions and/or actions within the virtual space. The second ability module may be configured to increment the levels of the users in the second ability based on purchases of the virtual currency by the users as facilitated by the currency exchange module. This may involve monitoring user purchasing of the virtual currency, determining an amount of virtual currency purchased by the user, advancing the user along the levels of the second ability based on the amount of virtual currency purchased by the user, and/or any other operations for incrementing user levels in the second ability based on the purchases of the virtual currency by the user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
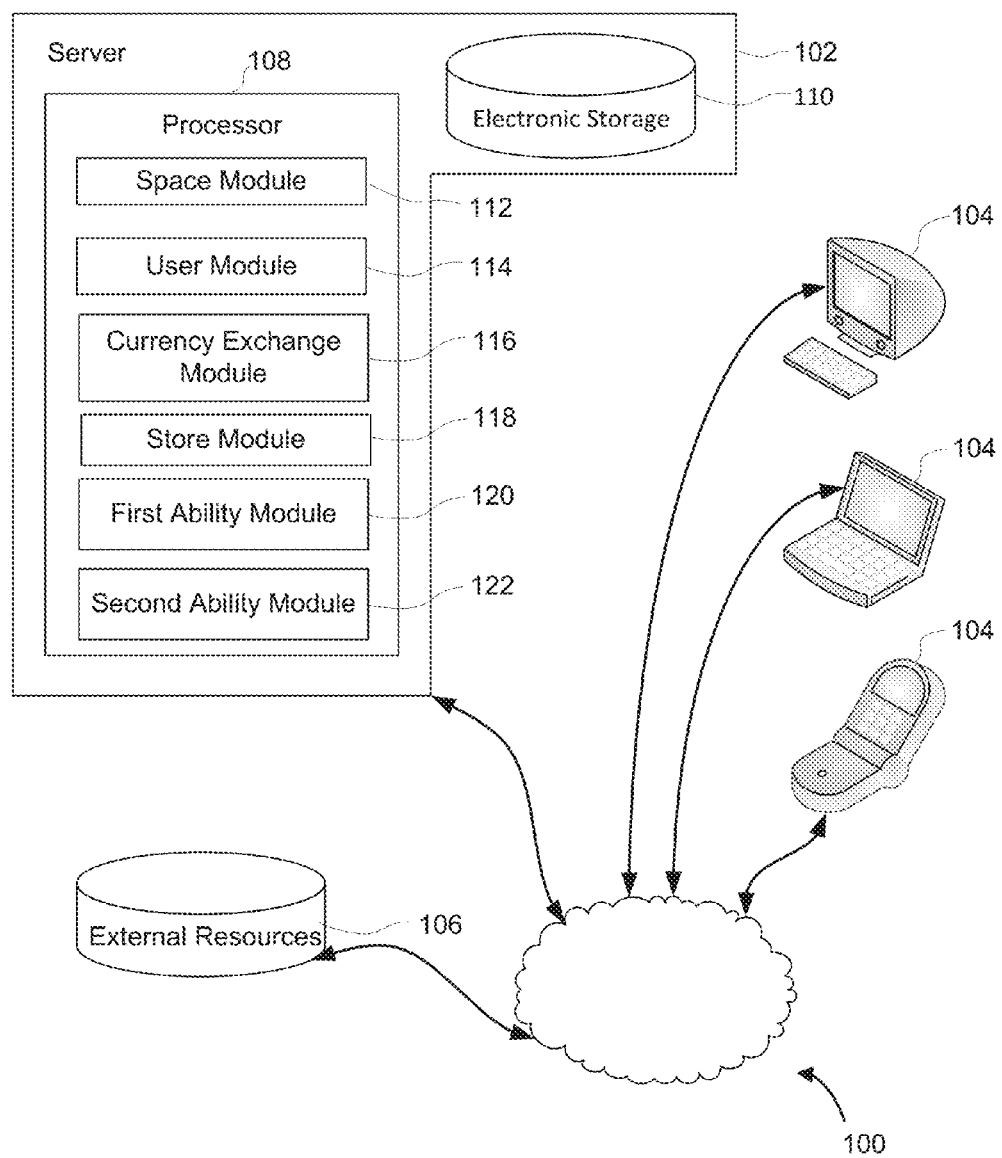
FIG. 1 illustrates a system configured to facilitate user progression in a virtual space based on purchases of virtual currency by the users.

FIG. 1 illustrates a system 100 configured to facilitate user progression in a virtual space based on purchases of virtual currency by the users. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The computer program modules may include one or more of a space module 112, user module 114, currency exchange module 116, store module 118, first ability module 120, second ability module 120, and/or other modules.

The space module 112 may be configured to execute an instance of the virtual space in which an online game takes place. The online game may include a browser-based multiplayer game (e.g., as enabled by Flash® technology), a multiplayer mobile game, a massive multiplayer online role-playing game, a LAN (local area network) party game, and/or any other types of online game wherein multiple players may interact with the virtual space and/or with each other. The space module 112 may be configured to implement the instance of the virtual space executed by the computer modules to determine state of the virtual space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 112 is not intended to be limiting. The space module 112 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the virtual space executed by space module 112, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space module 112).

Within the instance of the virtual space, virtual space activities may be provided to users to interact with the virtual space. Examples of virtual space activities may include constructing, upgrading, demolishing buildings, training, marching, reinforcing, reassigning, recruiting, arranging formations, and/or transporting troops, attacking, developing, creating, demolishing and/or defending cities, realms, kingdoms, and/or any other virtual space location entities, crafting or transporting virtual items, attacking, and/or interacting with non-player characters (NPCs hereinafter) and/or other user characters, researching for skills levels, experiences, mining and/or prospecting for virtual resources, completing missions, quests, and/or campaigns, and/or any other activities provided by the virtual space. Some virtual space activities may engage the users against an environment within the virtual space—i.e., PvE activities. In some examples, the virtual space activities may engage the users to compete against one another within the virtual space—i.e., PvP activities.

Some virtual space activities may require consumption of virtual resources, such as but not limited to, stone, wood, gold, minerals (e.g., iron, ore, oil, crystal, coal, etc.), plants, food, currencies (virtual and/or real currencies), improvement resource (e.g., health provided by fountain of youth, wisdom provided by tree of wisdom, speed-up provided by hour-glass, etc.) and/or any other virtual resources appropriate for the virtual space activities. During the virtual space activities, an amount of the resources required by the virtual space activities may be increased or decreased in the user inventory to reflect a consumption (including exhaustion) or procurement of the resources in the virtual space by the user.

The user may participate in the instance of the virtual space by initiating actions in the virtual space. In some implementations, the actions may be enabled by physical controls provided by the client computing platforms 104, such as but not limited to, play buttons, joysticks, motion sensors, cameras, keyboards, mouse, and/or any other physical controls provided by client computing platforms 104. In some implementations, the actions may be enabled by controls provided by graphical user interface (GUI) implemented on client computing platforms 104, such as but not limited to, graphics, menus, dialog boxes, forms, sliding bars, buttons, radio box, tabs, and/or any other controls provided by the GUI. In any case, as so enabled to initiate actions in the virtual space, the users may provide inputs to initiate virtual space maneuvers, to participate in virtual activities and/or engage in other interactions within the virtual space. For example, a given user may provide an input specifying an amount of troops to be marched to a virtual space location when defending that virtual space location. Commands may be generated for the given user initiated actions and may be executed by the space module 112 in the virtual space such that the user requested interactions with the virtual space may be effectuated in the virtual space. Execution of such a command by the space module 112 may produce changes to the virtual space state, which may reflect progresses and/or results of the user initiated actions.

Within the instance of the virtual space, virtual space abilities representing ranges of user actions and/or interactions may be provided. For example, the virtual space abilities may be provided to the users (e.g., via their user characters) to enable users to acquire one or more virtual skills, to construct and/or upgrade virtual buildings, to research virtual technologies, to inflict damages, to resist damages, to exercise magic powers, and/or to perform any other actions and/or user interactions in the virtual space as enabled the virtual space abilities. The virtual space abilities may take many forms to enable the user actions and/or interactions, for example such as, to allow the users to perform different virtual space maneuvers, to research virtual technologies, to take special actions during combat, to create virtual items (e.g., crafting), to build special virtual space infrastructure and/or objects, to upgrade existing virtual space entities to new types of entities (e.g., upgrading a warrior to a knight), to avoid penalties, to improve powers, strength, and/or health, and/or any other forms. To facilitate user progression in such virtual space abilities, provider, administrator, moderator, and/or any other entities related to the virtual space may establish rules for incrementally improving virtual space abilities of the users and/or to set up or enforce any other desirable regulations within the virtual space. By way of non-limiting examples, virtual space rules may be established to set forth orders of technologies discoverable or researchable by users (e.g., through technology trees), religion progressions by users (e.g. through a religion tree), skill progressions (e.g., through skill trees), orders of upgrading buildings or other infrastructures, special power progressions (e.g., virtual magic powers), military force advancement, trade terms, treaty terms, loans, user eligibility to undertake mission, quest, campaign, user's ability to engage with other users in the virtual space entities and/or for any other virtual space rules. In some examples, such virtual space rules may be predetermined at a configuration stage of system 100, while in some other examples such virtual space rules may evolve dynamically as the instance of the virtual space progresses. In some examples, user may be facilitated to program their own variant virtual space rules that may be incorporated in the virtual space rules.

Within the instance of the virtual space, skills may be acquired by the users to undertake the virtual space activities. The skills acquired by the users may be tangibly represented as abilities learned by user characters associated with the users, e.g., attacking, defending, healing, spell casting, leadership, and/or any other skills. Provider, administrator, moderator, and/or any other entities related to the virtual space may organize virtual space skills into different types, e.g., gathering, harvesting, attacking, healing, defending, and so on. Within an individual type of skills, sub-types may be further classified, and within an individual sub-type, further sub-types may be classified, and so on. Within a type or sub-type of skills, skill levels may be established to classify adeptness of the type or the sub-type of the skills, likelihood of the user is to succeed with the type or sub-type of skills, possible consequences of the type or sub-type of skills, and/or any other aspects of the type or sub-type of skills.

In any case, user progression in the virtual space may affect the abilities of the users to change the state of virtual space. For example, as a given user progresses in the virtual space by gaining new skills, powers, virtual technologies and/or any other virtual space abilities, the users may be able to undertake new actions, functions and/or deeds to interact with other users, non-user characters, virtual space objects, and/or engage in any other user interactions as enabled by these newly acquired abilities.

The users may participate in the instance of the virtual space through virtual space sessions. A virtual space session includes complete activities and actions of a user within the virtual space, from the very first user action when the user joins the virtual space for the first time to the last user action before the user stops participating in the virtual space for good. Accordingly, a virtual space session typically finishes when a user decides to stop interacting with the virtual space for good or when provider, administrator, moderator, and/or any other entities related to the virtual space stop providing the virtual space to users for good. However, this is not necessary the only case, a virtual space session may finish, in some examples, when one or more events or virtual space conditions have occurred and/or when one or more objectives have been achieved or not achieved by the user as determined by the provider, administrator, moderator, and/or any other entities related to the virtual space. For example, a virtual space session may finish when the user has killed the last monster in the virtual space; has achieved an ultimate goal in the virtual space; fails to achieve certain score or experience level within predetermined time; the user character has been killed in the virtual space; and so on.

A virtual space session may include one or more play sessions during which a user participates in the virtual space. That is, the time for the user to complete a virtual space session may be divided into several different occasions—i.e., different play sessions. In some examples, a play session may start from when a user logs into and finish when the user logs off system 100 in one occurrence. However, this is not necessary the only case. A player session may be determined by provider, administrator, moderator, and/or any other entities related to the virtual space in however measurements as desired. For example, a play session may be measured by frequencies of user participation in activities within the virtual space such that a play session finishes when the user stops participating activities for a period of time over a predetermined threshold.

Within the instance of the virtual space implemented by the space module 112, virtual currencies may be provided to facilitate store and/or exchange of virtual space values. Units of the virtual currencies (for example, a gold, a gem, a silver, a coin, a token, and so on) may provide measures of virtual space values as determined by a provider, administrator, moderator, user, and/or any other entities related to the virtual space. Through one or more units of virtual currencies, virtual space values may be captured, stored, and circulated in the virtual space.

The virtual currencies provided in the virtual space may be consumed or redeemed by users to facilitate virtual space actions and/or activities, purchases of virtual items, transactions between users, and/or for any other purposes within the virtual space. In some examples, the virtual currency consumption may be required to fund actions and/or activities engaged in by a user. For example, a quest may impose 100 coins entrance fee per user to cover the cost incurred for the provider of the virtual space to provide the quest (e.g., server space, programming efforts, marketing expenses, administration cost, record keeping cost and/or any other costs incurred by the virtual space provider). In some examples, the virtual currency consumption may facilitate purchase of virtual items and/or transactions between the users. By way of non-limiting examples, prices may be determined in units of the currencies for virtual items sold in a virtual store operated by provider, administrator, moderator, and/or any other entities related to the virtual space; and prices may be determined in units of the virtual currencies for virtual items sold in an auction house operated by the users of the virtual space.

In some examples, virtual resources or virtual items may be used for exchanging other resources or virtual items in the virtual space, and in that sense they may be used as virtual currency in the virtual space. For example, a seller user may ask for a particular virtual item or an amount of certain virtual resources in exchange for a virtual item the seller user is selling in an auction house. As such virtual resources or virtual items enable exchange of values in the virtual space, they may constitute forms of virtual currencies in those examples.

In any case, virtual currencies may be provided through however virtual space substances or elements in the virtual space as desired by the provider, administrator, moderator, and/or any other entities related to the virtual space. For one or more currencies circulated in the virtual space, denomination systems may be established to classify units of currencies and numerical relationships may be established among individual denominations of the currencies. By way of non-limiting examples, different types of a class of virtual space substances and/or elements, such as, gem, shell, stone, gold, plants, archeological fragments, and/or any other virtual space substances or elements may be used to establish such a currency denomination system. For instance, different types of herbs may be used as denominations of currencies in the virtual space, such as, without limitations, tea leaves, lotus roots, tree roots, *ginseng*, lily flower petal, and so on. Within individual denominations of such currencies, levels may be established to distinguish the denominations of the currencies, for example, level 1, 2, 3, 4, or 5 tea leaves, lotus roots, tree roots, *ginseng*, lily flower petal and so on. It is understood that levels of a currency denomination may be provided or established in the virtual space in however ways as desired by the provider, administrator, moderator, and/or any other entities related to the virtual space, and not necessarily limited to numerical classifications. For example, within tree leaves, different grades may be provided in the virtual space and used as levels of the tree leaves, such as, without limitations, fair, good, premium, rare and so on.

The user module 114 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information managed by the user module 114 may include information indicating levels in virtual space abilities possessed by the users. Such virtual space ability information about a given user may include a level of a first ability of the given user and a level of a second ability of the given user in the virtual space (e.g., level 3 in healing skill, and level 4 in the ability to advance Christianity).

The currency exchange module 116 may be configured to facilitate transactions by users in which the users may purchase virtual currency with real money value. As described above, virtual currency may be provided in the virtual space to store values of the virtual space and may be used to facilitate exchanges within the virtual space. The virtual currency purchasable by the users may be redeemed in a virtual store (e.g., a virtual marketplace, an auction house, a virtual trading post, a virtual item shop, and so on) for one or more benefits in the virtual space. By way of a non-limiting example, the transactions facilitated by the virtual currency exchange module 116 may include a transaction wherein a given user purchases an amount of gems, which may be redeemed by the user in a virtual store (including a virtual trading place administer by users) to redeem virtual items, resources, troops, buildings, services and/or any other merchandise in the virtual space.

In some exemplary implementations, the virtual currency module 116 may facilitate users to purchase virtual currency with real world money. Such facilitations may include maintaining user credit accounts linked with one or more credit cards of individual users, communicating with one or more third party payment service provider (e.g., Paypal®, Google Pay® and so on) for charging users an amount of real world money used by the user for purchasing virtual currency, communicating with an online currency issuer (e.g., bitcoin) for transferring the amount of real-world money used by the user for purchasing the virtual currency to one or more accounts associated with the provider of the virtual space, and/or any other operations that facilitate the users to purchase virtual currency with real world money.

The store module 118 may be configured to present offers of virtual items for sale to the users in exchange for virtual currency purchased by the users as facilitated by the currency exchange module 116. The offers of virtual items may be presented by the store module 118 through virtual store interfaces implemented on client computing platforms associated with the users. The virtual items included in the offers presented by the store module 118 may provide benefits to the users in the online game hosted by the space module 112. The benefits may include virtual objects (e.g., weapons, shields, boots, wardrobe, war chest, and so on) virtual resources (e.g., a bundle of lumber, stones, coals and so on), virtual buildings, virtual troops, virtual services (e.g., enhanced map services), extra play sessions (e.g., pay to play), increase in user character attributes and/or any other benefits that may give the users opportunities, improved abilities, enhanced power, and/or any other advantages in interacting with the virtual space. In some examples, the amount of virtual currency specified in the offers presented by the store module 118 for exchanging corresponding virtual items may be set forth by the provider, administrator, moderator, seller users (e.g., in an user administered trading post), and/or any other entities related to the virtual space.

The first ability module 120 may be configured to increment the levels of the users in a first ability provided in the virtual space based on gameplay by the users in the virtual space. As described above, the first ability provided in the virtual space may include virtual space abilities that enable users to acquire one or more virtual skills, to construct and/or upgrade virtual buildings, to research virtual technologies, to inflict damages, to resist damages, to exercise magic power, and/or to perform any other user actions in the virtual space that as enabled by the first ability. For example, without limitations, the first ability may include an ability in the virtual space for a given user via his/her user character to perform attack moves to inflict damages (e.g., special combination moves); for the given user to research virtual technologies in the area of transportation (e.g., road, sea traveling, highway, air transportation, high speed rail, aerospace traveling, and so on); for the given user to heal his/her troops (e.g., a special healing skill); for the given user to improve defense power to resist damages (e.g., increase in hit points); for the given user to gain special magic power to increase morality of his/her troops; and so on.

The increment of first ability of a given user in the virtual space may be progressive along the levels of the first ability established by provider, administrator, moderator, and/or any other entities related to the virtual space. The levels in the first ability may include rank classifications (e.g., level, 1, 2, 3, 4, 5, and so on of healing power), ability hierarchies (e.g., an ability may have sub-categories with identifying names such as beginner, mid-level, expert, master, and so on), increases in statistical attributes (e.g., increase in hit points, health points, knowledge points, etc.) and/or any other forms of levels that may be established to classify progressive range of user interactions and/or actions as enabled by the first ability.

In any case, the first ability module 120 may be configured to increment the levels of the users in the first ability based on gameplays by the users within the virtual space. This may involve monitoring user interactions with the virtual space, identifying different types of user interactions, evaluating gameplays effectuated by the user interactions, awarding points and/or virtual space attributes to the users based on the user interaction evaluations, advancing users along the levels of the first ability based on the points and/or attributes awarded to the users, and/or any other operations for incrementing user levels in the first ability. The gameplay based on which user levels in the first ability may include user performance of tasks, accumulation of points, success in activities, completion of quests, completion of objectives in the virtual space by the users and/or any other gameplay by the users within the virtual space.

By way of a non-limiting example, for a given user, the first ability module 120 may increment a given user's first ability upon the given user has accumulated a number of skill points that breaches a threshold for advancing to the next level of the first ability as established by the provider, administrator, moderator, and/or any other entities related to the virtual space; upon the given user has completed a quest required for advancing to the next level of the first ability; upon the given user's success in performing virtual space maneuvers in a combat against certain virtual space objects; and so on.

The second ability module 122 may be configured to increment the levels of the users in a second ability provided in the virtual space based on based on purchases of virtual currency by the users as facilitated by the currency exchange module. As described above, the second ability provided in the virtual space may include virtual space abilities that enable users to acquire one or more virtual skills, to construct and/or upgrade virtual buildings, to research virtual technologies, to inflict damages, to resist damages, to exercise magic power, and/or to perform any other user actions in the virtual space as enabled by the second ability. For example, without limitations, the second ability may include an ability in the virtual space for a given user via his/her user character to perform attack moves to inflict damages (e.g., special combination moves); for the given user to research virtual technologies in the area of transportation (e.g., road, sea traveling, highway, air transportation, high speed rail, aerospace traveling, and so on); for the given user to heal his/her troops (e.g., a special healing skill); for the given user to improve defense power to resist damages (e.g., increase in hit points); for the given user to gain special magic power to increase morality of his/her troops; and so on. In some exemplary implementations, the second ability and the first ability may be separate and distinct in the virtual space such that they enable different types of user interactions and/or actions within the virtual space. For example, the first ability may be a user ability to develop virtual technologies in the area of artillery while the second ability may be a user ability to heal his/her troops.

Similar to the first ability, the increment of second ability of a given user in the virtual space may be progressive along the levels of the second ability as established by provider, administrator, moderator, and/or any other entities related to the virtual space. The levels in the second ability may similarly include ranking classifications, ability hierarchies, increases in statistical attributes, and/or any other forms of levels that may be established to classify progressive range of user interactions and/or actions as enabled by the second ability.

In any case, the second ability module 122 may be configured to increment the levels of the users in the second ability based on purchases of the virtual currency by the users as facilitated by the currency exchange module 116. This may involve monitoring user purchasing of the virtual currency, determining an amount of virtual currency purchased by the user, advancing the user along the levels of the second ability based on the amount of virtual currency purchased by the user, and/or any other operations for incrementing user levels in the second ability. By way of a non-limiting example, for a given user, the second ability module 122 may increment a given user's second ability upon the given user has purchased 100 coins in the virtual space by increasing 100 attribute points in the user's second ability; upon the given user has purchased 50 coins by increasing 50 attribute points in the user's second ability; upon the given user has purchased 25 coins in the virtual space by increasing 25 attribute points in the user's second ability; and so on.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120. Processor 108 may be configured to execute modules 112, 114, 116, 118, 120 by software; hardware; firmware; some combination of software, hardware, and/or firmware; and/or other mechanisms for configuring processing capabilities on processor 108.

It should be appreciated that although modules 112, 114, 116, 118, 120 are illustrated in FIG. 1 as being co-located within a single processing unit, in implementations in which processor 108 includes multiple processing units, one or more of modules 112, 114, 116, 118, 120 may be located remotely from the other modules. The description of the functionality provided by the different modules 112, 114, 116, 118, 120 described below is for illustrative purposes, and is not intended to be limiting, as any of modules 112, 114, 116, 118, 120 may provide more or less functionality than is described. For example, one or more of modules 112, 114, 116, 118, 120 may be eliminated, and some or all of its functionality may be provided by other ones of modules 112, 114, 116, 118, 120. As another example, processor 108 may be configured to execute one or more additional modules that may perform some or all of the functionality attributed below to one of modules 112, 114, 116, 118, 120.

Figure 2:
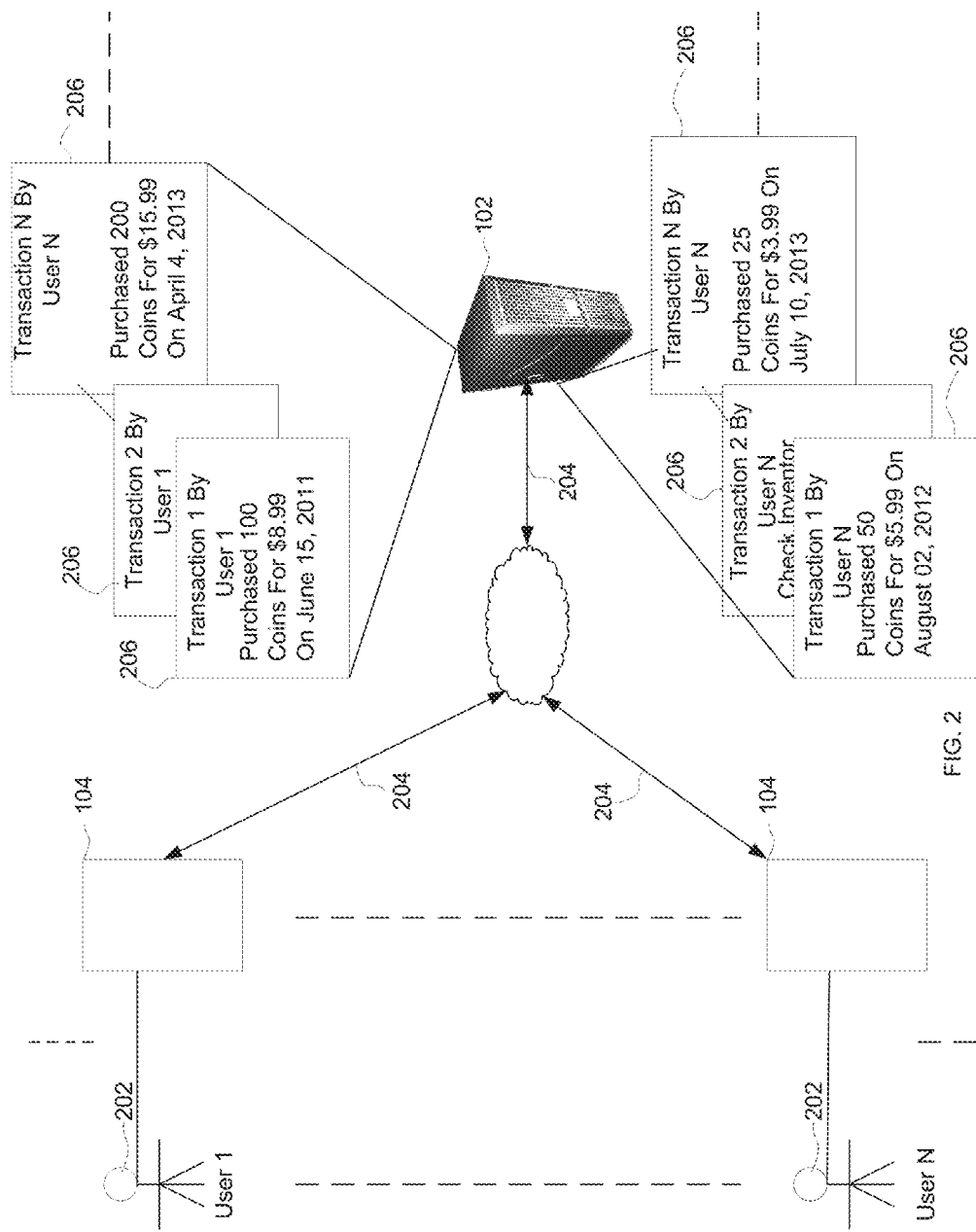
FIG. 2 illustrates an example of facilitating user progression in a virtual space based on user purchases of virtual currencies in the virtual space using the system shown in FIG. 1.

FIG. 2 illustrates an example of facilitating user progression in a virtual space based on user purchases of virtual currencies in the virtual space using the system shown in FIG. 1. It will be described with references to FIG. 1. As shown in this example, users 202 of the virtual space provided by system 100 may be associated with client computing platforms 104. As illustrated, the users 202 may engage in interactions 204 with the virtual space via server 102. As shown in this example, the interactions 204 may include transactions 206 by the users in which the users purchase virtual currency with real world money. As shown in this example, the transactions 206 by the users 202 may be recorded by the server 102 to keep track of an amount of real world money spent by the users 202 in exchange for corresponding amounts of virtual currency.

Figure 3:
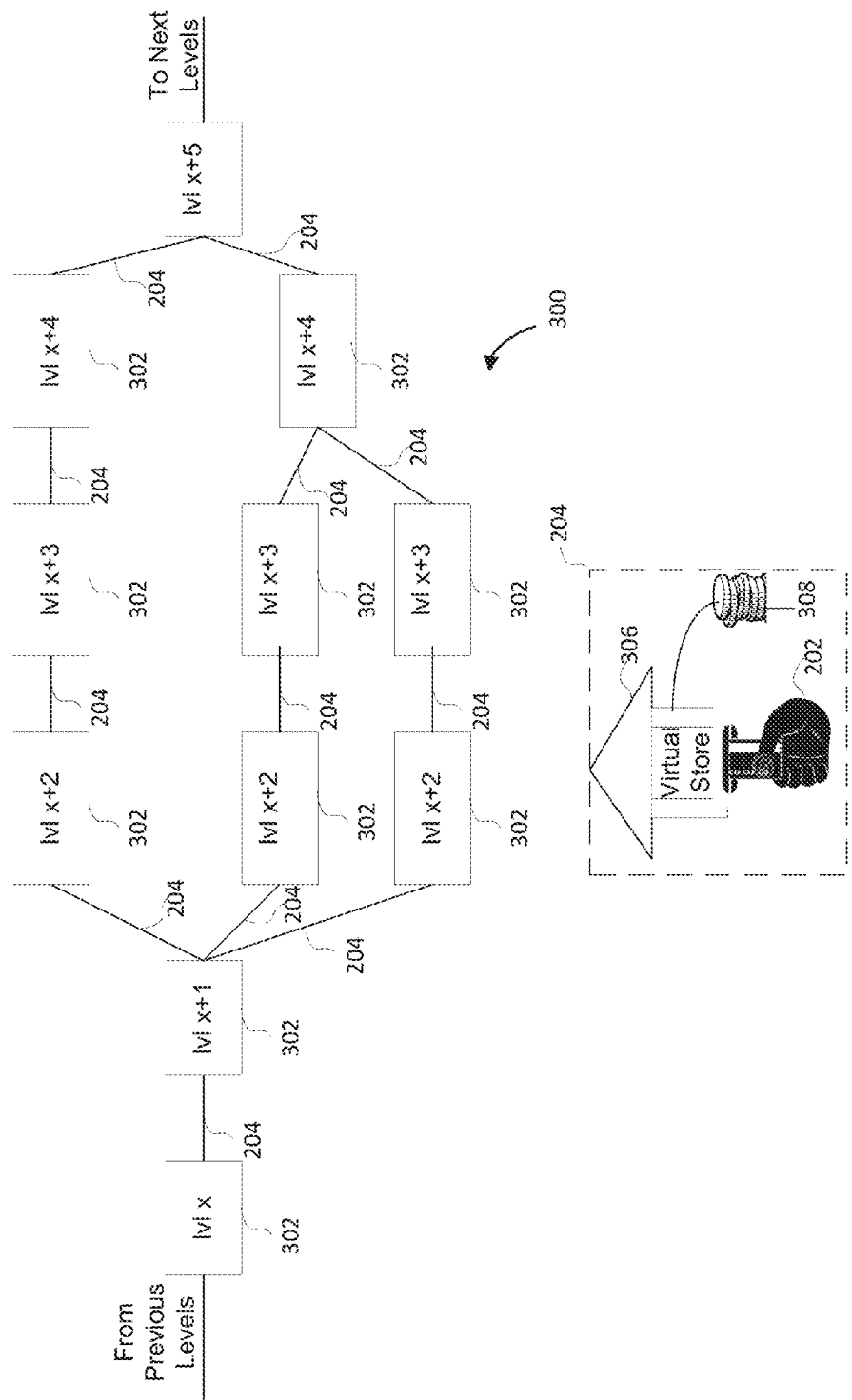
FIG. 3 illustrates an example of incrementing a user's level in a second ability based on the transaction information described in FIG. 2.

FIG. 3 illustrates an example of incrementing a user's level in a second ability 300 based on the transaction 206 described in FIG. 2. It will be described with references to FIGS. 1-2. As shown, levels 302 may be established by a provider, administrator, moderator, and/or any other entities related to the virtual space to represent different range of user interactions and/or actions enabled by the second ability 300. As shown, a user level in the second ability may be incremented in accordance a hierarchical organization such that the user 202 must achieve levels x x+1, x+2, x+3, x+4 and x+5 in such an order to improve his/her second ability 300. As also shown, different paths may be established for the user 202 to achieve levels x+2, x+3 and x+4. It should be appreciated that the levels 302 shown in this example is merely illustrative and thus not intended to be limiting. The relationships of different levels in the second ability may be such as however desired by the provider, administrator, moderator, and/or any other entities related to the virtual space. For example, single path linear levels in the second ability are contemplated in some other examples.

As shown, levels of the second ability 300 may be incremented based on the transaction 204 made by user 202 for purchasing virtual currency. As illustrated, in a transaction 204, the user 202 may purchase an amount of virtual currency 308 through a virtual store. Based on such a transaction 204 by the user 202, user levels in ability 300 may be incremented, e.g. based on the amount of virtual currency 308 purchased by the user 202, frequency of purchase, type of virtual currency purchased and so on.

Figure 4:
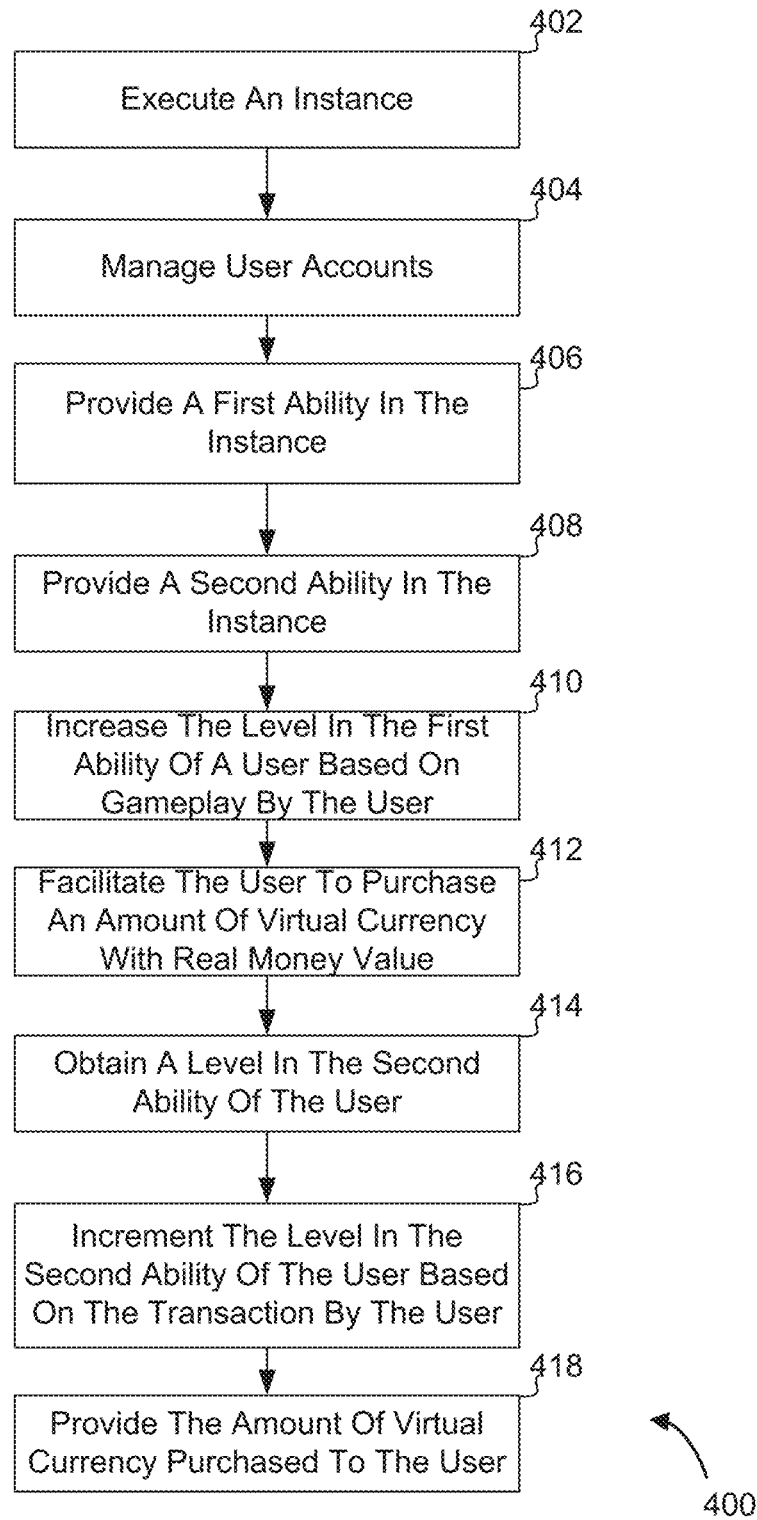
FIG. 4 illustrates an exemplary method of facilitating user progression in the virtual space based on purchases of virtual currency by the users.

FIG. 4 illustrates a method 400 of facilitating user progression in the virtual space based on purchases of virtual currency by the users. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a virtual space may be executed and implemented to determine view information for transmission to one or more client computing platforms associated with users. The users may interact with the virtual space by initiating virtual space commands. The users may include a first user. The first user may control a first entity. In some implementations, operation 402 may be performed by a space module the same as or similar to space module 112 (shown in FIG. 1 and described herein).

At an operation 404, user accounts associated with the users may be managed. The user accounts may include a first account associated with the first user. The first account may include a first set of user parameters that correspond to the first user. In some implementations, operation 404 may be performed by a user module the same as or similar to user module 114 (shown in FIG. 1 and described herein).

At an operation 406, a first ability may be provided in the virtual space to facilitate user actions and/or interactions within the virtual space. The first ability provided in the virtual space may include virtual space abilities that enable users to acquire one or more virtual skills, to construct and/or upgrade virtual buildings, to research virtual technologies, to inflict damages, to resist damages, to exercise magic power, and/or to perform any other user actions in the virtual space as enabled by the first ability. In some implementations, operation 406 may be performed by a first ability module the same as or similar to first ability module 120 (shown in FIG. 1 and described herein).

At an operation 408, a second ability in the virtual space may be provided to facilitate user interactions and/or actions within the virtual space. The second ability provided in the virtual space may include virtual space abilities that enable users to acquire one or more virtual skills, to construct and/or upgrade virtual buildings, to research virtual technologies, to inflict damages, to resist damages, to exercise magic power, and/or to perform any other user actions in the virtual space as enabled by the second ability. In some exemplary implementations, the second ability and the first ability may be distinct in the virtual space such that they enable different types of user interactions and/or actions within the instance of the virtual space. In some implementations, operation 408 may be performed by a second ability module the same as or similar to second ability module 122 (shown in FIG. 1 and described herein).

At an operation 410, the level of a user in the first ability provided in operation 406 may be increased based on the gameplay by the user in the instance of the virtual space. This may involve monitoring the user's interactions with the virtual space, identifying different types of the user's interactions, evaluating gameplays effectuated by the user's interactions, advancing the user level in the first ability based on evaluation, and/or any other operations for incrementing the user's level in the first ability. The gameplay based on which user levels in the first ability may include user performance of tasks, accumulation of points, success in activities, completion of quests, completion of objectives in the virtual space by the users and/or any other gameplay by the users within the virtual space. In some implementations, operation 410 may be performed by a first ability module the same as or similar to first ability module 120 (shown in FIG. 1 and described herein).

At an operation 412, the user may be facilitated to purchase an amount of virtual currency with real money value. Such facilitations in the operation 412 may include maintaining user credit accounts linked with one or more credit cards of individual users, communicating with one or more third party payment service provider (e.g., Paypal®, Google Pay® and so on) for charging users an amount of real world money used by the user for purchasing virtual currency, communicating with an online currency issuer (e.g., bitcoin) for transferring the amount of real-world money used by the user for purchasing the virtual currency to one or more accounts associated with the provider of the virtual space, and/or any other operations that facilitate the users to purchase virtual currency with real world money. In some implementations, operation 412 may be performed by a currency exchange module the same as or similar to currency exchange module 116 (shown in FIG. 1 and described herein).

At an operation 414, a level of the user in the second ability may be obtained. The level of the user in the second ability obtained in operation 414 may include a numeral (e.g., level 1, 2, 3 and so on), ability hierarchies (e.g., sub-categories elements and the like of the second ability), increases in statistical attributes (e.g., as quantified as second ability points), and/or any other forms of levels that may be established to classify progressive range of user interactions and/or actions as enabled by the second ability. In some implementations, operation 414 may be performed by a user module the same as or similar to user module 114 (shown in FIG. 1 and described herein).

At an operation 416, the level of the user in the second ability as obtained in operation 414 may be incremented based on the purchase of the virtual currency by the user as facilitated by operation 412. This may involve monitoring user purchasing of the virtual currency, determining an amount of virtual currency purchased by the user, advancing the user along the levels of the second ability based on the amount of virtual currency purchased by the user in operation 414, and/or any other operations for incrementing user levels in the second ability. In some implementations, operation 416 may be performed by a second ability module the same as or similar to second ability module 122 (shown in FIG. 1 and described herein).

At an operation 418, the amount of virtual currency purchased by the user as facilitated by operation 412 may be provided to the user. In some implementations, operation 418 may be performed by a currency exchange module the same as or similar to currency exchange module 116 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate user progression in a virtual space based on user purchases of virtual currency, the system comprising:
one or more processors configured by machine-readable instructions to:
execute an instance of the virtual space in which an online game takes place, to implement the instance of the virtual space by receiving and executing commands in the instance of the virtual space to facilitate user participation in the online game, and to facilitate presentation of the virtual space on client computing platforms;
manage user accounts associated with individual users, the user accounts indicating, for individual users, a level in a first ability and a level in a second ability, the user accounts including a first user account associated with a first user that indicates a level of the first user in the first ability and a level of the first user in the second ability;
facilitate transactions by users in which the users purchase virtual currency with real money value;
present offers of virtual items for sale to the users in exchange for virtual currency purchased by the users, the offers being presented to the users through store interfaces implemented on client computing platforms associated with the users;
increment levels of the users in the first ability based on gameplay by the users, wherein the first ability and the gameplay by the users are separate from both the transactions in which users purchase virtual currency and the offers of virtual items for sale; and
responsive to purchases of virtual currency, increment levels of the users in the second ability and provide the virtual currency purchased to the users based on the purchases of the virtual currency, without requiring separate benefit purchases, such that responsive to the first user purchasing a first amount of virtual currency, the first user receives the first amount of virtual currency and the level of the first user in the second ability is incremented, wherein the second ability is separate from both the transactions in which users purchase virtual currency and the offers of virtual items for sale.

2. The system of claim 1, wherein the one or more processors are further configured by machine-readable instructions such that the second ability and the first ability of the first user includes one or more of a skill, a virtual magical power, a damage inflicting ability, a damage resisting ability, a virtual technology, or a level for a building or other infrastructure.

3. The system of claim 2, wherein the first and second abilities are separate and distinct within the virtual space.

4. The system of claim 1, wherein the one or more processors are further configured by machine-readable instructions such that the facilitated transactions include a first transaction in which the first user purchases the first amount of virtual currency with real world money.

5. The system of claim 4, wherein the one or more processors are further configured by machine-readable instructions such that the facilitated transactions include a second transaction in which the first user purchases a second amount of virtual currency.

6. The system of claim 1, wherein the one or more processors are configured by machine-readable instructions such that the offers of virtual items presented to the users in exchange for virtual currency purchased by the users provide benefits to the users in the online game.

7. The system of claim 6, wherein the benefits in the online game include virtual objects, virtual resources, virtual buildings, virtual troops, virtual services and/or play sessions.

8. The system of claim 1, wherein the one or more processors are further configured by machine-readable instructions such that the gameplay by the users that is a basis on which the levels of the users in the first ability are incremented, include performance of tasks, accumulation of points, success in activities, completion of quests and/or completion of objectives in the virtual space by the users.

9. The system of claim 1, wherein the one or more processors are further configured by machine-readable instructions such that:
the user accounts including a second user account associated with a second user that indicates a level of the second user in the first ability and a level of the second user in the second ability; and
responsive to the second user purchasing a second amount of virtual currency, the second user receives the second amount of virtual currency and the level of the second user in the second ability is incremented.

10. A method for facilitating user progression in a virtual space based on user purchases of virtual currency, the method being implemented in one or more physical processors configured by machine-readable instructions, the method comprising:
executing an instance of the virtual space in which an online game takes place, implementing the instance of the virtual space by receiving and executing commands in the instance of the virtual space to facilitate user participation in the online game, and facilitating presentation of the virtual space on client computing platforms;
managing user accounts associated with individual users, the user accounts indicating, for individual users, a level in a first ability and a level in a second ability, the user accounts including a first user account associated with a first user that indicates a level of the first user in the first ability and a level of the first user in the second ability;
presenting offers of virtual items for sale to the users in exchange for virtual currency purchased by the users, the offers being presented to the users through store interfaces implemented on client computing platforms associated with the users;
facilitating transactions by users in which the users purchase virtual currency with real money value;
incrementing levels of the users in the first ability based on gameplay by the users, wherein the first ability and the gameplay by the users are separate from both the transactions in which users purchase virtual currency and the offers of virtual items for sale; and
responsive to purchases of virtual currency, incrementing levels of the users in the second ability and providing the virtual currency purchased to the users based on the purchases of the virtual currency, without requiring separate benefit purchases, such that responsive to the first user purchasing a first amount of virtual currency, providing the first amount of virtual currency to the first user and incrementing the level of the first user in the second ability, wherein the second ability is separate from both the transactions in which users purchase virtual currency and the offers of virtual items for sale.

11. The method of claim 10, wherein the second ability and the first ability of the first user includes one or more of a skill, a virtual magical power, a damage inflicting ability, a damage resisting ability, a virtual technology, or a level for a building or other infrastructure.

12. The method of claim 11, wherein the first and second abilities are separate and distinct within the virtual space.

13. The method of claim 10, wherein the facilitated transactions include a first transaction in which the first user purchases the first amount of virtual currency with real world money.

14. The method of claim 13, wherein the facilitated transactions include a second transaction in which the first user purchases a second amount of virtual currency.

15. The method of claim 10, wherein the offers of virtual items presented to the users in exchange for virtual currency purchased by the users provide benefits to the users in the online game.

16. The method of claim 15, wherein the benefits in the online game include virtual objects, virtual resources, virtual items, virtual buildings, virtual troops, virtual services, and/or play sessions.

17. The method of claim 10, wherein the gameplay by the users that is a basis on which the levels of the users in the first ability are incremented, include performance of tasks, accumulation of points, success in activities, completion of quests and/or completion of objectives in the virtual space by the users.

18. The method of claim 10, wherein the user accounts including a second user account associated with a second user that indicates a level of the second user in the first ability and a level of the second user in the second ability; and responsive to the second user purchasing a second amount of virtual currency, providing the second user the second amount of virtual currency and incrementing the level of the second user in the second ability.

* * * * *